A. CHRISTIANSON.
PASSENGER CAR FRAME.
APPLICATION FILED JULY 2, 1910.
992,164.
Patented May 16, 1911.
2 SHEETS—SHEET 2.
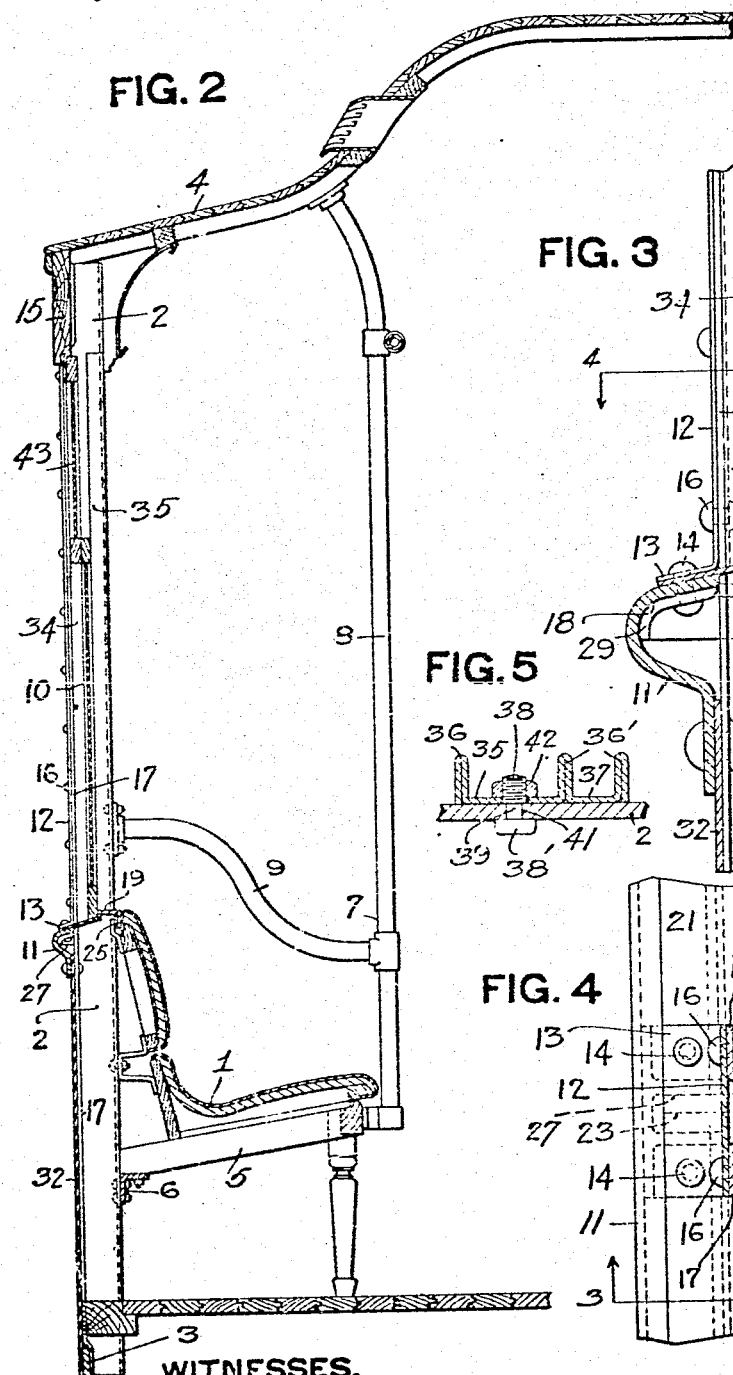
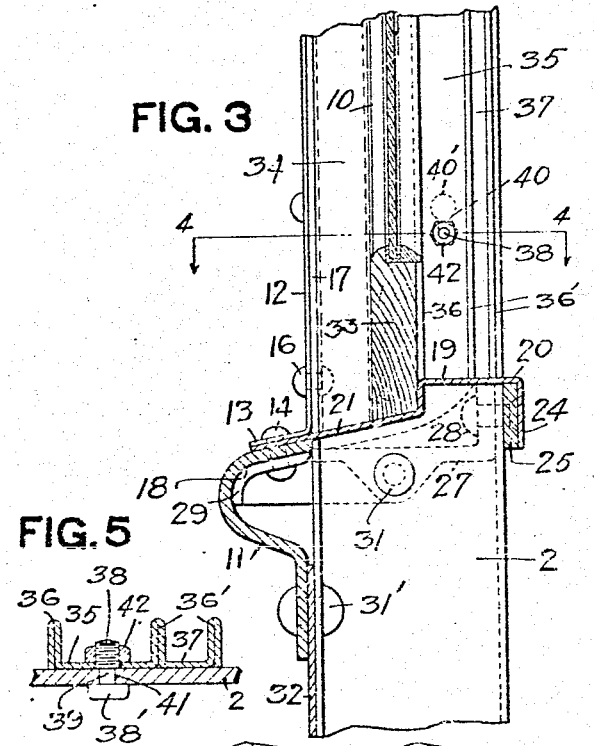
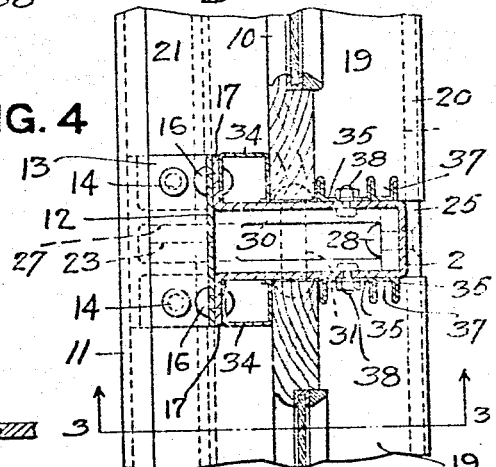
WITNESSES.
J. R. Keller
Robt. C. Totten
INVENTOR.
Andrew Christianson
By Kay & Totten
Attorneys

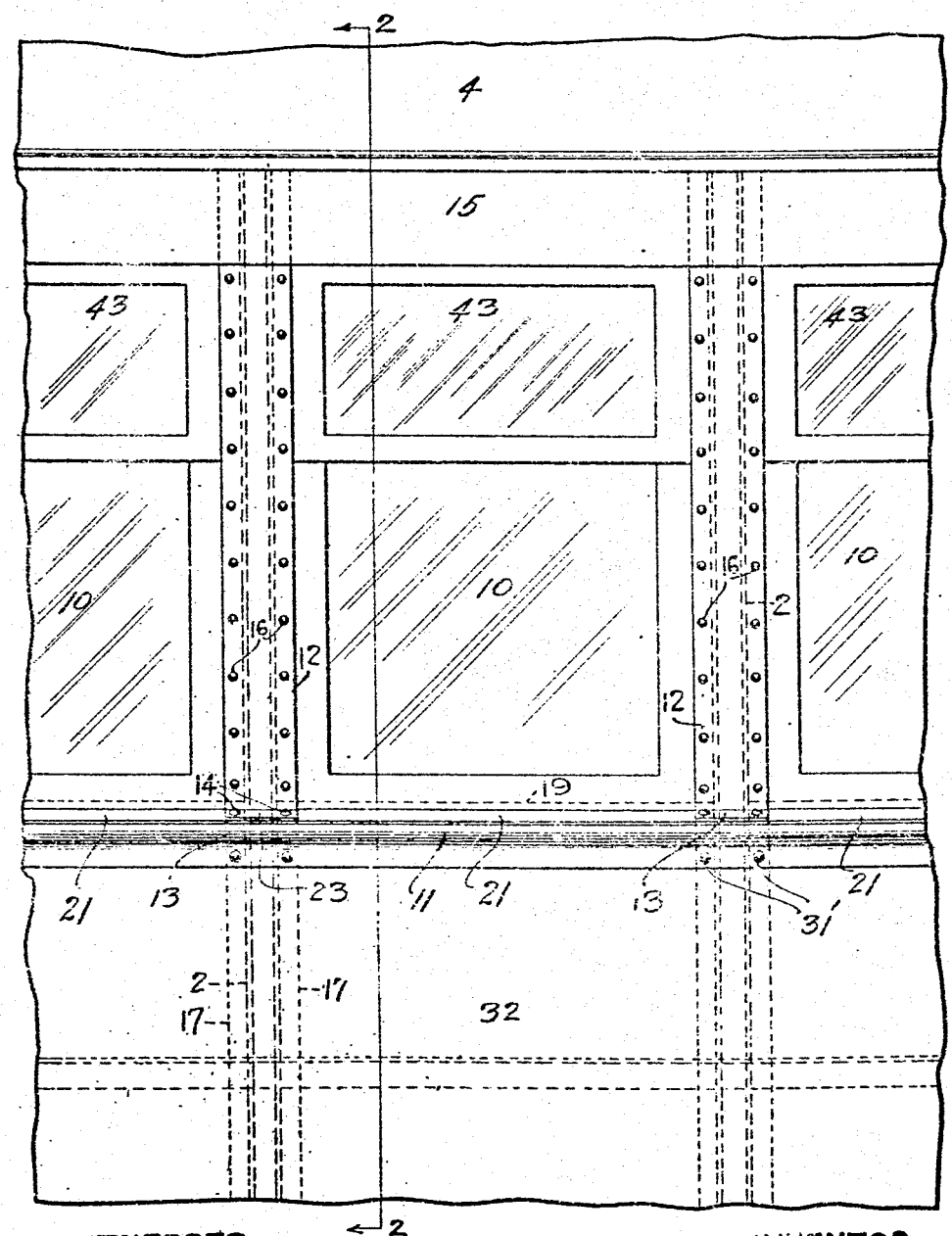

UNITED STATES PATENT OFFICE.

ANDREW CHRISTIANSON, OF BUTLER, PENNSYLVANIA, ASSIGNOR TO STANDARD STEEL CAR COMPANY, OF PITTSBURG, PENNSYLVANIA, A CORPORATION OF PENNSYLVANIA.

PASSENGER-CAR FRAME.

992,164.  Specification of Letters Patent.   Patented May 16, 1911.

Application filed July 2, 1910. Serial No. 570,034.

*To all whom it may concern:*

Be it known that I, ANDREW CHRISTIANSON, a resident of Butler, in the county of Butler and State of Pennsylvania, have invented a new and useful Improvement in Passenger-Car Frames; and I do hereby declare the following to be a full, clear, and exact description thereof.

My invention relates to passenger car frames. Its object is to provide an improved light and rigid construction of metallic frames for passenger cars, and especially that type of cars which is provided with a series of closely arranged windows extending for all or a large part of the length of the car on each side.

To these ends my improved construction contemplates, generally stated, a car frame having a series of side posts of open form or U-shape and a belt rail of open form extending longitudinally of the car side across the posts, in combination with bracing members arranged within said side posts and belt rail at their junction. In my construction I also provide preferably cover plates attached to the posts of open form and to the belt rail, and window sill plates between the posts preferably provided with downwardly extending flanges along their inner sides, and a connecting and bracing member in the form of a filler strip within said flanges, and extending across the side posts, being attached thereto and also preferably to the bracing members.

It also consists in certain other combinations and features as hereinafter pointed out and claimed.

In the drawings Figure 1 is a fragmentary side view of a portion of a car illustrating the belt rail and the frame construction in dotted lines; Fig. 2 is a vertical transverse section of part of a car illustrating my invention; Fig. 3 is a detail vertical section on a larger scale taken on the line 3—3 Fig. 4; Fig. 4 is a horizontal section on the line 4—4 Fig. 3; and Fig. 5 is a detail horizontal section.

The car illustrated in the drawing is of a type known as a "subway" car, in which the seat 1 extends longitudinally of the car for a large part of its length, although it will be understood that my invention is applicable to all types of passenger cars in which it is desired to provide a rigid frame construction, while at the same time affording maximum space for windows. The side post 2 is of U-form, as illustrated clearly in Fig. 4, and is attached at its lower end to the side sill 3 and supports the roof 4 at its upper end. The seat frame 5 is shown securely bolted to the side post 2 by the angle iron 6, and the interior rod frame 7 has the vertical member 8 attached at its lower end to the seat frame 5, and at its upper end to the roof 4, the horizontally disposed member 9 of said rod frame being bolted to the side post 2. The seat and interior frame construction forms in itself no part of my invention, although it acts in combination with the improved side frame construction of my invention to provide a rigid support for the car roof. The U-posts 2 extend between each of the windows 10 and are rigidly attached to the belt rail 11 by the cover plate 12. The cover plates 12 are each provided at their lower ends with the outwardly extending flange 13, which is rigidly secured to the belt rail 11 by the rivets 14, and they preferably extend upwardly along the face of the U-posts 2 to the fascia plate 15, being securely fastened to the U-post 2 by the rivets 16 extending through the flange 17 of the said U-posts.

The window sill plates 19 extend horizontally between each of the posts 2 below the windows 10, and comprise preferably the inner channel portions 20 and the outer flange portions 21. The outer flange portions 21 are recessed at their ends to admit the outer flanges 17 of the U-posts 2 and the cover plate 12, and have extensions which abut against each other at 23 and fit between the flange 13 of the cover plate 12 and the belt rail 11. The channel portion 20 of the sill plate 19 has a downwardly extending flange 24 to which is internally fastened the filler strip 25 extending longitudinally of the side frame.

The bracing member 27, which is preferably a light casting, is fastened within each U-post 2 and rigidly secured to the inner face 18 of the belt rail 11. The rivets 28 also serve to rigidly secure the filler strip 25 to the bracing member 27; and the rivets 14 rigidly secure the bracing member 27 to the cover plate 12 (and sill plate 19), as well as the belt rail 11. The bracing member 27 is constructed preferably with the downwardly curved outer flange 29, which serves to brace the connection between the bracing member and the belt rail and flange 13 of the cover plate, as described above. The portion 30 of the bracing member 27 is securely fastened to the post 2, as by the rivets 31. I thus provide a very rigid metallic side frame, as the post 2 and belt rail 11, the cover plate 12, the metallic sill plates 19, and the filler strips 25 are all rigidly secured to the bracing member 27. The belt rail 11 is also rigidly secured to the post 2 by the rivets 31', which likewise serve to fasten the side sheeting 32 to the belt rail and posts respectively. Thus each of the members is rigidly fastened to at least two of the other members, and the bracing member 27 is rigidly attached to all of the other members.

Stalls for the window sashes 33 are provided by the filler pieces 34 and filler-strips 35, the filler strip 35 having corrugations or folds 36 and 36', the folds 36' providing the slot 37 for the sash curtain as illustrated. The filler strips 35 are attached to the U-posts 2 by the T-bolts 38, which have the reduced neck portions 39. In setting up the strips 35 the bolt head 38' is introduced through the enlarged portion 40' of the slot 40, and the bolt then lowered therein until the reduced portion 39 fits in the reduced portion 41 of the slot. The filler strip may then be firmly attached by the nut 42, and the bolt will not be lost within the U-post 2 when the nut 42 and filler strip 35 are removed.

The fascia plates 15, which directly support the roof 4 are attached to the flanges 17 of the posts 2 at their upper ends, the cover plates 12 terminating at such fascia plates. The upper windows 43 are supported from the posts 2 in any desired fashion.

What I claim as new is:

1. In passenger car frames, the combination with vertically arranged side posts of hollow form, a belt rail of open or hollow form connecting the same, and bracing members arranged within said side posts and said belt rail at their junction.

2. In car frames, the combination with side posts of hollow form, of a belt rail extending horizontally and rigidly attached to said side posts, a cover plate for each of said side posts rigidly attached to said belt rail, and bracing members arranged within each of said side posts and rigidly secured thereto, and to said belt rail and cover plates.

3. In car frames, the combination of U-posts, a belt rail of open or U-form, the said U-posts and belt rail having their open faces disposed toward each other, and bracing members within the U-posts having outer portions adapted to fit within the belt rail, and means for rigidly securing said bracing members to said belt rail and said U-posts respectively.

4. In car frames, the combination with a side post of open or U-form, and a belt rail of open form attached thereto, of a casting adapted to fit within both said side post and said belt rail and rigidly attached thereto.

5. In car frames the combination with a side post of open or U-form, of a belt rail of open form, a bracing member adapted to fit within said U-post and said open belt rail and brace the same, and a cover plate on said U-post rigidly attached to said belt rail and said bracing member.

6. A passenger car frame having side posts, a horizontally disposed belt rail connecting the same below the windows, window sill plates extending between each of said side posts, and attached to said belt rail, and a bracing member within said side posts and secured to said belt rail.

7. A passenger car frame having side posts of U-shape, a belt rail attached to said posts on their outer sides, sill plates arranged between said side posts and having outer flanges attached to said belt rail and provided with inner flanges, a bracing member within each of the U-posts and rigidly attached to said belt rail, and filler pieces within said inner flanges of said sill plates, and rigidly attached to said posts and bracing members, substantially as described.

8. A passenger car frame having side posts, a longitudinally disposed belt rail connecting the same below the windows, window sill plates extending between each of said side posts and provided with inner flanges, and a filler strip extending across said posts and within said flanges, substantially as described.

9. A passenger car frame having side posts, a belt rail attached thereto and extending horizontally along the outside thereof, window sill plates arranged between said posts and attached to said belt rail and provided with inner flanges, a bracing member attached to each of said posts and to said belt rail, and filler posts extending across the inside of said side posts within said inner flanges and rigidly attached to said bracing members.

In testimony whereof, I, the said ANDREW CHRISTIANSON have hereunto set my hand.

ANDREW CHRISTIANSON.

Witnesses:
ROBERT C. TOTTEN,
JOHN F. WILL.